(12) United States Patent
Suit et al.

(10) Patent No.: US 8,191,141 B2
(45) Date of Patent: May 29, 2012

(54) METHOD AND SYSTEM FOR CLOAKED OBSERVATION AND REMEDIATION OF SOFTWARE ATTACKS

(75) Inventors: John M Suit, Mount Airy, MD (US); Vipul Sharma, Germantown, MD (US); Mark I Yourcheck, Hanover, MD (US); Daniel L Becker, Frederick, MD (US)

(73) Assignee: Red Hat, Inc., Raleigh, NC (US)

( * ) Notice: Subject to any disclaimer, the term of this patent is extended or adjusted under 35 U.S.C. 154(b) by 930 days.

(21) Appl. No.: 11/767,173

(22) Filed: Jun. 22, 2007

(65) Prior Publication Data

US 2008/0320592 A1 Dec. 25, 2008

(51) Int. Cl.
H04L 29/06 (2006.01)

(52) U.S. Cl. ........................................................ 726/23
(58) Field of Classification Search ..................... 726/23
See application file for complete search history.

(56) References Cited

U.S. PATENT DOCUMENTS

| | | | |
|---|---|---|---|
| 7,181,769 B1 | 2/2007 | Keanini et al. | |
| 7,356,679 B1 | 4/2008 | Le et al. | |
| 7,600,259 B2 | 10/2009 | Qi | |
| 7,698,545 B1 | 4/2010 | Campbell et al. | |
| 7,761,917 B1 | 7/2010 | Kumar | |
| 7,877,781 B2 | 1/2011 | Lim | |
| 7,886,294 B2 | 2/2011 | Dostert et al. | |
| 2003/0014626 A1* | 1/2003 | Poeluev et al. | 713/153 |
| 2003/0046586 A1 | 3/2003 | Bheemarasetti et al. | |
| 2003/0084329 A1* | 5/2003 | Tarquini | 713/200 |
| 2003/0101245 A1 | 5/2003 | Srinivasan et al. | |
| 2003/0120935 A1 | 6/2003 | Teal et al. | |
| 2005/0010765 A1* | 1/2005 | Swander et al. | 713/166 |
| 2005/0102529 A1* | 5/2005 | Buddhikot et al. | 713/200 |
| 2005/0125503 A1 | 6/2005 | Iyengar et al. | |
| 2005/0240558 A1 | 10/2005 | Gil et al. | |
| 2005/0289648 A1 | 12/2005 | Grobman et al. | |
| 2006/0037072 A1* | 2/2006 | Rao et al. | 726/14 |
| 2006/0041885 A1 | 2/2006 | Broquere et al. | |
| 2006/0136720 A1 | 6/2006 | Armstrong et al. | |
| 2006/0156380 A1* | 7/2006 | Gladstone et al. | 726/1 |
| 2006/0271395 A1 | 11/2006 | Harris et al. | |
| 2007/0011667 A1 | 1/2007 | Subbiah et al. | |
| 2007/0043860 A1 | 2/2007 | Pabari | |
| 2007/0058551 A1 | 3/2007 | Brusotti et al. | |

(Continued)

FOREIGN PATENT DOCUMENTS

WO WO2005050414 6/2005

(Continued)

OTHER PUBLICATIONS

Red Hat Office Action for U.S. Appl. No. 11/867,456, mailed Aug. 1, 2011.

(Continued)

*Primary Examiner* — Michael S McNally
(74) *Attorney, Agent, or Firm* — Lowenstein Sandler PC

(57) ABSTRACT

A method and system provide security for a communication network and for one or more nodes within the network. Software can be distributed throughout the network from a centralized location or administrative console. The software can be made resident in the kernel of the operating system of a receiving node. The software can provide an observation functionality, an analysis functionality, a reporting functionality and a remediation functionality or some subset of those functionalities.

18 Claims, 8 Drawing Sheets

U.S. PATENT DOCUMENTS

| | | | |
|---|---|---|---|
| 2007/0198656 A1 | 8/2007 | Mazzaferri et al. | |
| 2007/0204153 A1 | 8/2007 | Tome et al. | |
| 2007/0234412 A1 | 10/2007 | Smith et al. | |
| 2007/0261112 A1 | 11/2007 | Todd et al. | |
| 2008/0005124 A1 | 1/2008 | Jung et al. | |
| 2008/0016570 A1 * | 1/2008 | Capalik | 726/23 |
| 2008/0047009 A1 | 2/2008 | Overcash et al. | |
| 2008/0056487 A1 | 3/2008 | Akyol et al. | |
| 2008/0089338 A1 | 4/2008 | Campbell et al. | |
| 2008/0140795 A1 | 6/2008 | He et al. | |
| 2008/0184225 A1 | 7/2008 | Fitzgerald et al. | |
| 2008/0263658 A1 | 10/2008 | Michael et al. | |
| 2008/0271025 A1 | 10/2008 | Gross et al. | |
| 2008/0288962 A1 | 11/2008 | Greifeneder et al. | |
| 2008/0320499 A1 | 12/2008 | Suit et al. | |
| 2008/0320561 A1 | 12/2008 | Suit et al. | |
| 2008/0320583 A1 | 12/2008 | Sharma et al. | |
| 2008/0320592 A1 | 12/2008 | Suit et al. | |
| 2009/0182928 A1 | 7/2009 | Becker et al. | |
| 2009/0183173 A1 | 7/2009 | Becker et al. | |
| 2009/0210427 A1 | 8/2009 | Eidler et al. | |
| 2009/0216816 A1 | 8/2009 | Basler et al. | |
| 2009/0254993 A1 | 10/2009 | Leone | |
| 2010/0011200 A1 | 1/2010 | Rosenan | |
| 2010/0332432 A1 | 12/2010 | Hirsch | |

FOREIGN PATENT DOCUMENTS

| | | | |
|---|---|---|---|
| WO | WO 2005050414 A1 * | 6/2005 | |
| WO | WO2005101782 | 10/2005 | |
| WO | WO 2005101782 A1 * | 10/2005 | |

OTHER PUBLICATIONS

Red Hat Office Action for U.S. Appl. No. 11/867,456, mailed Feb. 16, 2011.

Red Hat Office Action for U.S. Appl. No. 12/111,110, mailed Mar. 17, 2011.

Red Hat Office Action for U.S. Appl. No. 12/111,110, mailed Aug. 17, 2011.

Red Hat Office Action for U.S. Appl. No. 11/867,500, mailed Dec. 23, 2010.

Red Hat Notice of Allowance for U.S. Appl. No. 11/867,500, mailed Jun. 29, 2011.

Red Hat Office Action for U.S. Appl. No. 12/013,304, mailed Apr. 13, 2011.

Red Hat Office Action for U.S. Appl. No. 12/013,314 mailed Jul. 19, 2011.

Office Action for U.S. Appl. No. 11/867,456, mailed Feb. 16, 2011.

Office Action for U.S. Appl. No. 11/867,500, mailed Dec. 23, 2010.

* cited by examiner

METHOD AND SYSTEM FOR CLOAKED OBSERVATION AND REMEDIATION OF SOFTWARE ATTACKS

BACKGROUND

The invention relates generally to the detection and remediation of software attacks. More specifically, and without limitation, the invention is related to a software based system that is transparent to a host device and which detects attacks directed to that device.

Researchers have long been concerned about software based attacks to computer systems and devices. These attacks, in the form of what is called "malware" can serve various purposes such as surreptitiously collecting information from an attacked device, monitoring or interrupting communication flows via the attacked device, hijacking device or system resources and even disabling the device and/or network. Examples of these types of security threats which can be network borne include traditional threats such a virus, a trojan, and a worm. Traditional detection and remediation techniques ultimately rely on the ability to determine the "signature" of such malware and construct a remediation response that detects an attack by looking for that signature and then undertaking some responsive action. The techniques in which the system first has to determine a signature of a particular form of malware means that at least one, if not multiple, attacks were successful before the attack could be analyzed to determine the signature.

In addition to the shortcomings of existing malware remediation techniques, the evolving complexity of these device and network security threats has created significant concerns. Specifically, network borne security threats are becoming more sophisticated and potentially more damaging. For example, some security researchers have begun to warn about the threat of malware referred to as rootkits. These malware attacks install themselves into the kernel of the operating system. In so doing they can bypass all of the current anti-virus, host and network intrusion detection sensors.

For example, in relationship to one of the operating systems available from Microsoft, the rootkit malware is installed so as to bypass the IP protocol. Communications from this rootkit flow without being blocked by normal firewalls. Also, since the rootkit executes within the kernel of the operating system, that there is no process or executable to be blocked with known or anti-virus and anti-spyware software.

A need therefore exists for a software security arrangement and process that is capable of adapting to the changing malware landscape and which can address rootkit type malware. It would also be useful if a software security arrangement could detect and remedy new trojan viruses which are attempting to exploit the device or network, without having to rely on the traditional signature-based detection and remediation approaches.

SUMMARY

In accordance with one embodiment of the invention, a software based detection and remediation arrangement is received by a device such as a node within a communications network. The software could be distributed to one or more nodes from a central node via the network. Once the software based detection and remediation arrangement is received, it is installed in the kernel of the operating system of the receiving node. The installation can be such that it is transparent to, or undetected by the user of the node. The installed detection and remediation software monitors data packet traffic between an adaptive driver layer and a protocol layer. The data packets can be analyzed to study their contents and/or characteristics by observation software installed at the node. As an attack is detected, remediation software, installed at the node, defines and instructs actions to be executed to thwart the attack.

In a further embodiment of the invention, the detection and remediation software reports that it has detected and/or remediated an attack to the central node.

In yet another embodiment of the invention, the detection and remediation software is distributed to multiple nodes within a network and is installed at each receiving node. The receiving nodes then operate collaboratively such that the flow of data packets throughout the network can be monitored. For example, one of the nodes might detect an inappropriate data stream from one of the other nodes and then take action along with other nodes, possibly including the central node, to isolate and/or ignore the offending node. The collaborative approach could even extend to defining remediative measures to correct for the attack on the offending node.

Additional embodiments of the invention may relate to the way in which the detection and remediation software is distributed and installed, the way in which packet flow is detected and analyzed, the types of observations made based on the analysis, and the remediative measures undertaken in response to those observations.

DETAILED DESCRIPTION

Overview

In view of the ever-evolving threats to device and network security posed by sophisticated malware attacks, it would be beneficial to provide a software-based security mechanism that can observe and analyze data packet flows where that mechanism can be transparent to the node or nodes in which it is installed. Various embodiments of this mechanism and an exemplary process for installing it are described in the following subsections. As indicated, this mechanism could be remotely distributed from a single hardware platform to one or more nodes within an enterprise network. The mechanism could be installed in stages and each stage can be selected with the characteristics of that node in mind. The configuration at any given mode could comprise an observation functionality, an analysis functionality, a reporting functionality, a remediation functionality or some subset of those functionalities.

An Overview of an Exemplary Architecture

Figure 1:
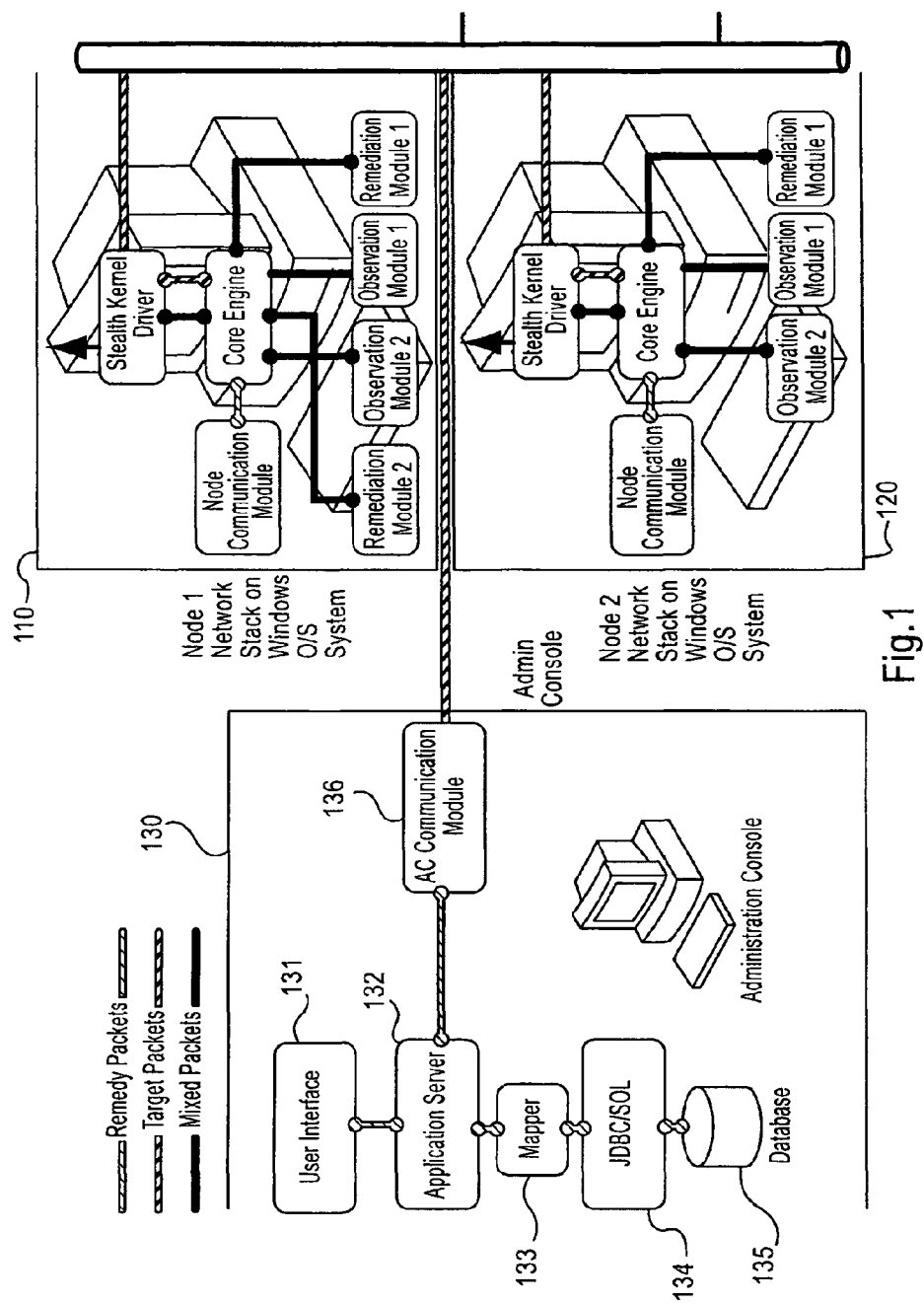
FIG. 1 illustrates an example of a high level component architecture usable in an embodiment of the invention.

FIG. 1 illustrates an example of a high level component architecture usable with an embodiment of the present invention. In this exemplary arrangement there are two network nodes 110 and 120 shown, although the number of network nodes is not intended to be limited to two. Additionally, while the network nodes are shown to be similar, they may be very different without affecting the use of the invention. The network nodes are coupled for data communication flow via a data transmission medium. The transmission medium could be wired, wireless, or some combination thereof and its type is not relevant to practicing the invention. In this embodiment, another computer platform 130 can be in communication with the network nodes via the data transmission medium. In this example, that platform is called an administration console (AC).

In this example, the AC has at least the following components: user interface 131, application server 132, mapper 133, JDBC/SQL 134, database 135 and AC communication module 136. The AC propagates the security mechanism out to the various network nodes via the data transmission medium. It might propagate the mechanism in stages so as to first cause a receiving network node to install the core aspect or core engine of the mechanism when a user of the node logs in. The installation is designed to be transparent to the user and the core engine is hooked into the stack of the operating system of the node. This installation thus yields the disposition of the core engine and stealth kernel driver as shown in each of nodes 110 and 120.

Once the core engine component is installed, the AC may send a communication module component that enables data traffic pertaining to the security mechanism functionality to be conveyed or communicated to and/or from that network node. These components are shown as the node communication modules in each of nodes 110 and 120.

Once the node communication module is installed, the AC can forward one or more observation modules to the node. Examples of types of observation modules will be described below. Each such module can be designed to receive data packets intercepted between an adapter driver and a protocol layer of the node's operating system and then analyze the data packets to determine whether they are indicative of some activity or behavior of interest.

In addition, the AC can transmit to a node one or more remediation modules. Each remediation module can be designed to execute one or more actions to respond to the detected behavior or activity. The response could take the form of some corrective action to avoid or remediate harm that might otherwise result from the detected behavior or activity.

The communications between the nodes and the AC are such that as activity is detected by an observation module or a remediative action is undertaken by a remediation module, that fact may be communicated back to the AC via the data transmission medium.

In one possible embodiment, the user interface of the AC will present a security dashboard to an operator. The dashboard will facilitate operator actions intended to remotely install, execute, report on and manage the security of the enterprise from a single geographic location.

In addition to illustrating components of interest, FIG. 1 illustrates example packet flows that indicate those packets directed to the security mechanism, packets that are target packets, that is packets of interest to the security mechanism, and flows where the packets are mixed, that is where there are target packets and security mechanism packets. In this example, the packet flow between the highlighted components with AC 130 are directed to the security mechanism, as is the traffic between the core engine and the node communication module within a node. The traffic between the core engine and the observation modules and remediation modules pertains to the target packets. The remainder of the illustrated data packet flows can be considered mixed.

Figure 2:
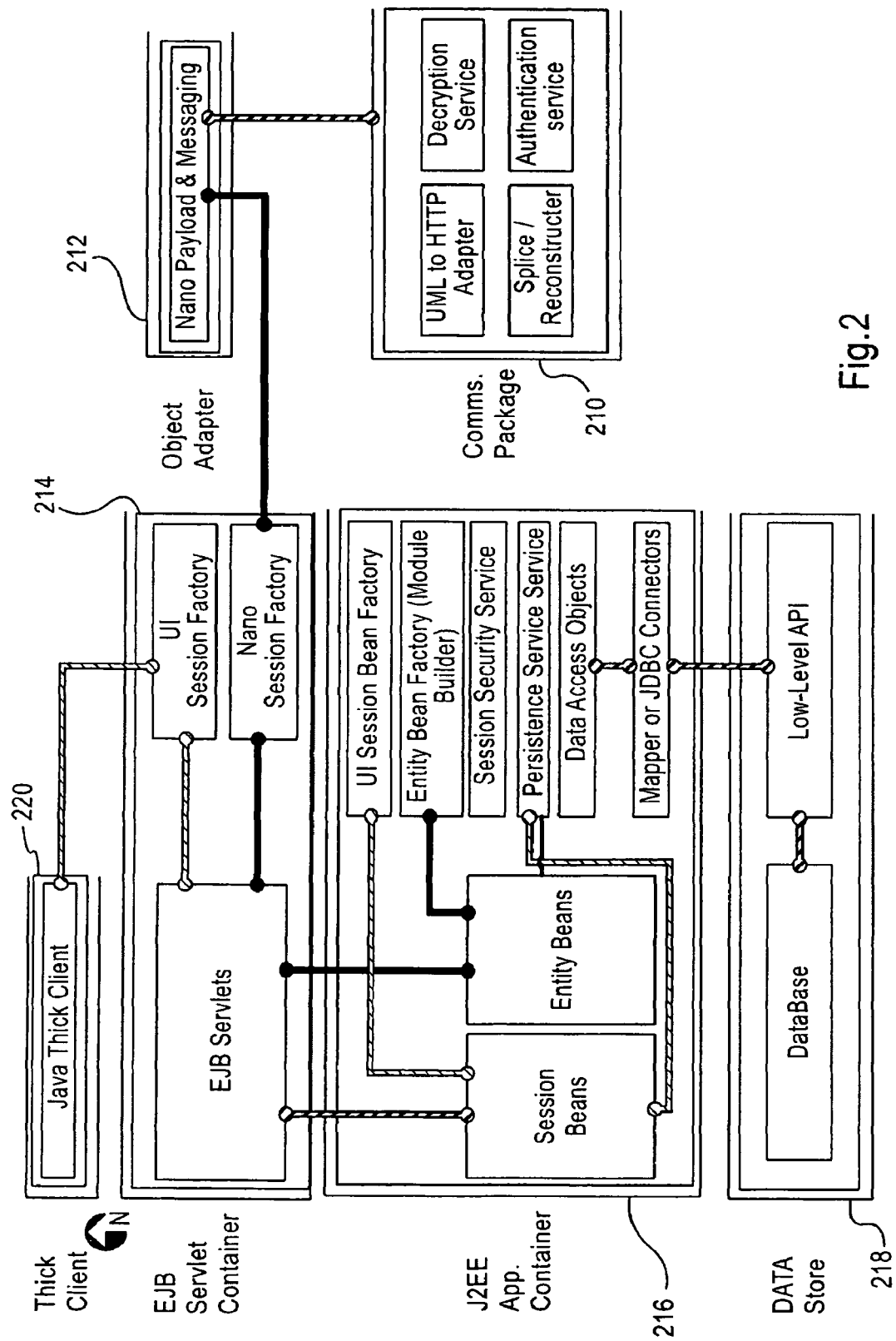
FIG. 2 illustrates an example of a high level component architecture of central node usable in an embodiment of the invention.

FIG. 2 illustrates an example of a high level component architecture that could be used to implement an administrative console having the features and functionality of that described above in relation to FIG. 1.

In the example of FIG. 2, the AC can include six major components, a communication package 210, an object adapter 212, an EJB Servlet container 214, a J2EE Application Container 216, a data store 218, and thick client 220.

In one example configuration, data store can include a relational database to store all persistent data pertaining to the security mechanism. This data can include, but is not limited to, system configuration information, system state information, activity reports from node modules such as from a communication module, an observation module or remediation module. The database could additionally store module activity event configuration, network topology data, node inventory data, operator credentials, and operator activity log data. Thus, the AC can monitor, track and act on information detected and/or collected by the security mechanism at the respective nodes. As a consequence, an operator or system monitor can prescribe further security-related activities to the network via the various network nodes. Also, because the AC can see the reports of multiple nodes, it can detect security attacks that might not be detectable by a single network node operating on its own.

Figure 3:
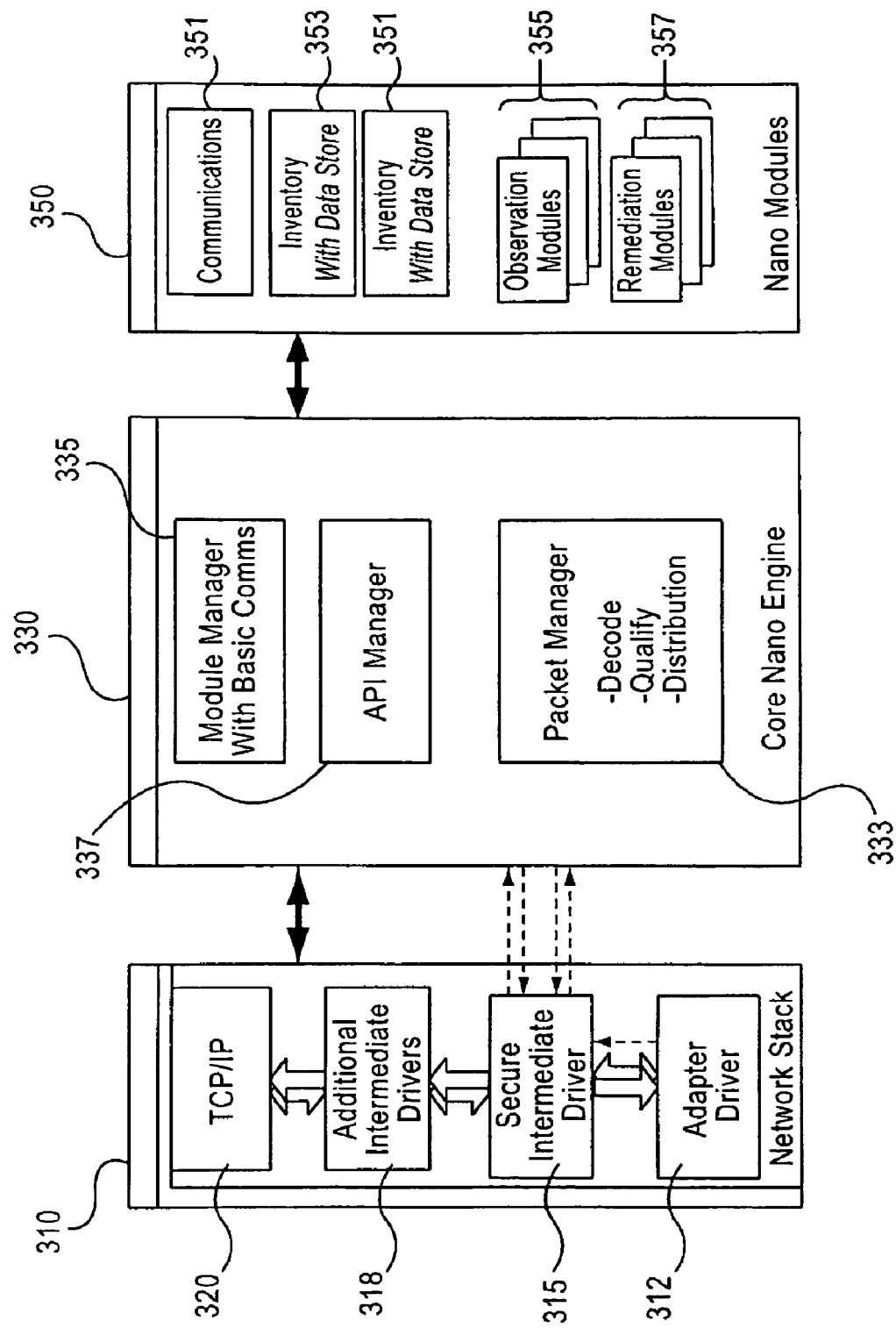
FIG. 3 illustrates an example of a high level component architecture of an installed detection arrangement usable in connection with the arrangement of FIG. 1.

FIG. 3 illustrates an example of a high level component architecture which could be used in the arrangement of FIG. 1. This exemplary illustration shows three major components of the network node, the network stack 310, a core engine 330, and a modules component 350. In accordance with this embodiment, a secure intermediate driver (SID) 315 is installed in the network stack, at the bottom of that stack, adjacent to adapter driver 312. As illustrated the network stack might also include additional intermediate drivers 318 between the SID 315 and the protocol layer, here TCP/IP 320. The SID 315 is one example of a packet driver that can intercept data packets from the network stack for processing by the remainder of the security mechanism. Specifically, once a packet is intercepted, it can be provided to the core engine (CE) which as shown in FIG. 3 can include a module manager 335, an API manager 337 and a packet manager 333. The CE will decode, qualify and route packets to any module which needs to process the packet. The CE can even be dynamically updated at run time.

The modules for observation and/or remediation are associated with the module component 350. In this example, the module component includes communications capabilities 351, inventory data stores 353, one or more observation modules 355 and one or more remediation modules 357. These observation and remediation modules are intended to handle the details of the packet processing operations. The modules also can be dynamically updated.

The above-described architecture is designed to include multiple strategies for packet drivers. An appropriate packet driver for a particular customer or node will depend on customer requirements. While the specifics may vary, it is beneficial if a packet driver has one or more of the following characteristics:

1. it intercepts packets as close to the adapter driver as possible;
2. it allows the packet driver to be re-installed if disabled by user control;
3. it detects whether the connection to the adapter driver is hooked/intercepted/tampered with in any way; and
4. persists in the core engine in non-volatile memory and load and execute the Core Engine.

Additionally, the Secure Intermediate Driver described above can be designed so that, for example in a Microsoft operating system environment, it will effectively look like an adapter driver to the protocols and a protocol to the adaptive driver. The SID can then forward all of the packets to the CE and it can effectively forward all packets between the protocols and the adapter driver transparently if desired.

Figure 4:
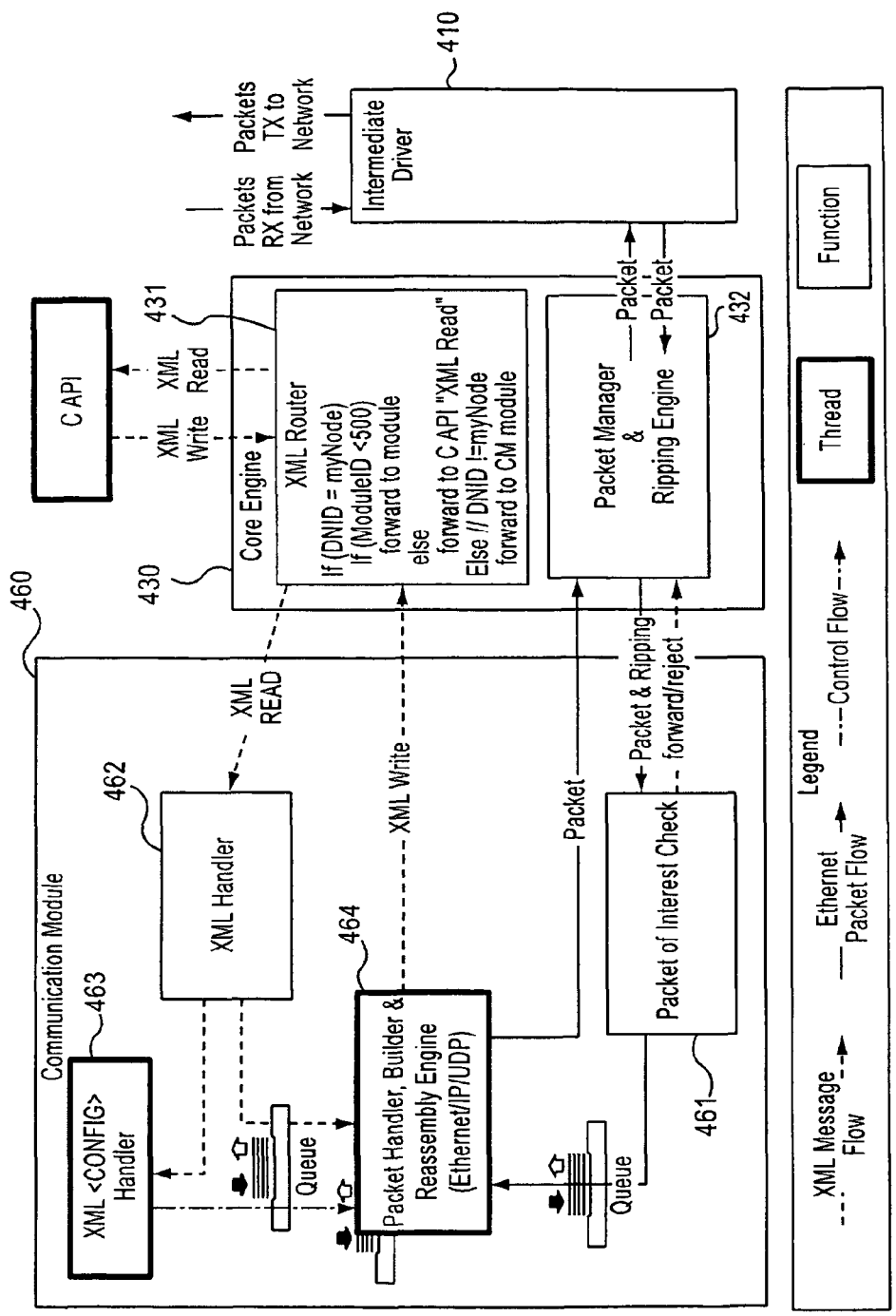
FIG. 4 illustrates another high level view of an installed detection arrangement along with exemplary packet flows.

FIG. 4 provides another component level diagram of an aspect of the security mechanism which can be installed in a node such as in FIG. 1. In this illustration additional features of the Core Engine are illustrated and aspects of a communication module, such as element 460 in FIG. 1 are shown in detail.

In FIG. 4 an intermediate driver 410 receives packets from the network and transmits packets to the network. This could be the SID described above. The intermediate driver intercepts packets from this flow and provides them to the CE 430. In this illustration two aspects of the CE are referred to, XML router 431 and Packet Manager and Ripping Engine 432. The intermediate driver exchanges packets with Packet Manager and Ripping Engine 432. As will be described in connection with FIG. 5, the Core Engine will forward packets to/from the drivers to any module that is registered to receive that traffic. In this illustration, however, the focus is on communications, particularly between this instantiation of the security mechanism and another instantiation of the mechanism at another node or with the Administrative Console.

In the arrangement of FIG. 4, the XML Router interacts with C-API, a device that has a read/write interface that enables the AC to communicate with elements of the security mechanism. Furthermore, the XML Router and the Packet Manager and Ripping Engine interface with communication module 460. The Packet Manager and Ripping Engine sends an intercepted packet to the Packet of Interest Check 461. If the packet is of interest it is queried for processing by the Packet Handler, Builder and Reassembly Engine 464 which is responsive to XML Handler 462 and XML <CONFIG> Handler 463. The result is that the communications module will take any XML message destined for another security mechanism and package that message into an Ethernet message. The Ethernet message is sent back to the Packet Manager in the CE and is forwarded to the Intermediate Driver for transmission on the network.

Figure 5:
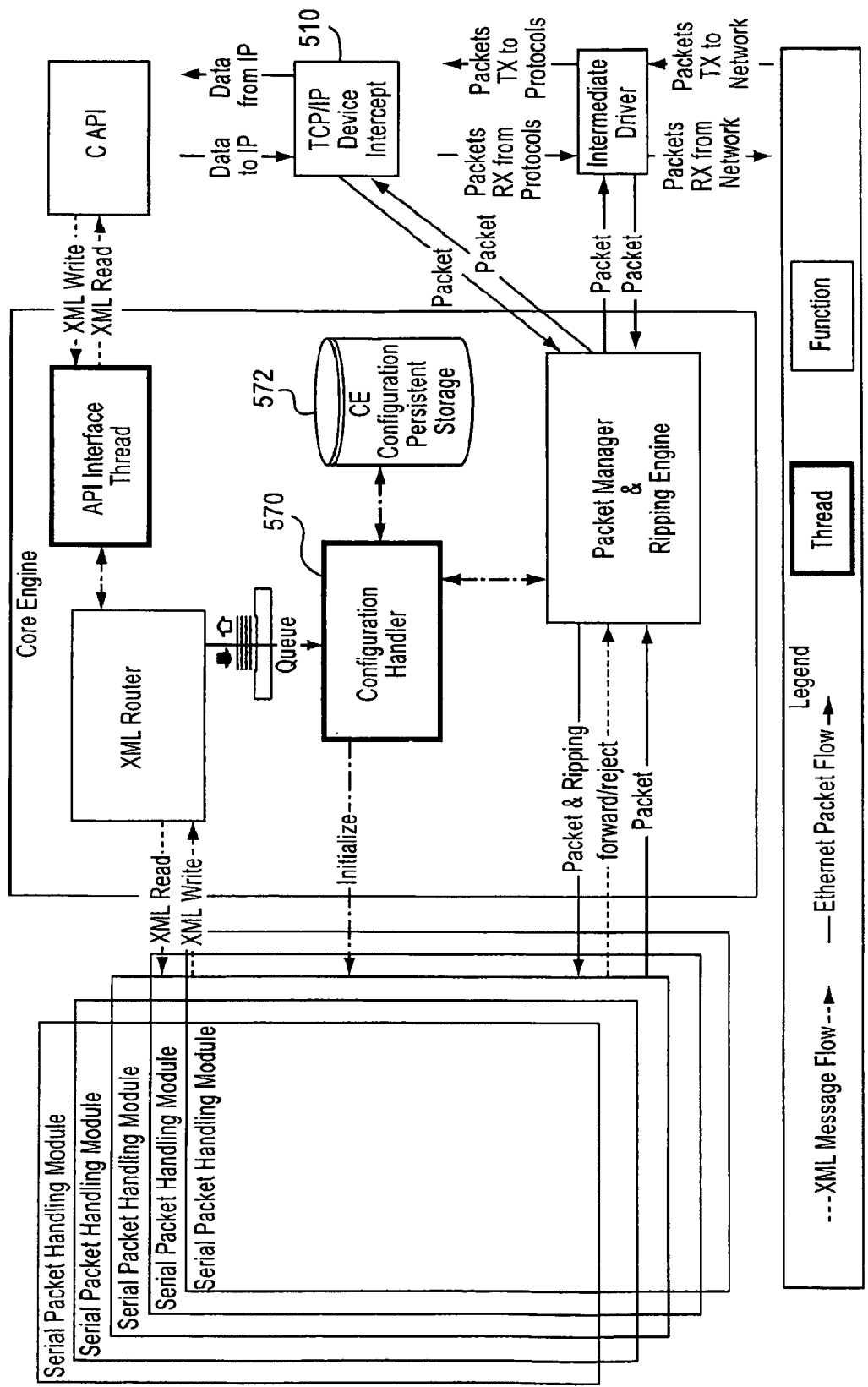
FIG. 5 illustrates an example of a component level arrangement usable in a configuration such as FIG. 4.

FIG. 5 provides another component level view of aspects of the Core Engine. In this illustration, the Core Engine is shown interfacing with the C API and the intermediate driver as in FIG. 4. However, this illustration shows the CE interacting with one or more modules and with a TCP/IP Device Intercept. Also, this arrangement shows more aspects of the CE.

In this arrangement, the CE's Packet Manager and Ripping Engine exchanges packets with the intermediate driver, as above, and with the TCP/IP device intercept 510. The Packet Manager and Ripping Engine further exchanges packets with various handling modules as appropriate.

Within the CE, the API interface thread handles the read/write interface from the CAPI as described above with respect to FIG. 4. The XML Router performs the same functions as in FIG. 4 but is now shown to interface more specifically with a configuration handler 570 that has associated CE Configuration persistent storage 572. The Configuration Handler is a thread that will process all CE<CONFIG> messages and will persist the current configuration so it can be retrieved on any re-start. This might even include information about any of the modules that have been installed in the system.

Figure 6:
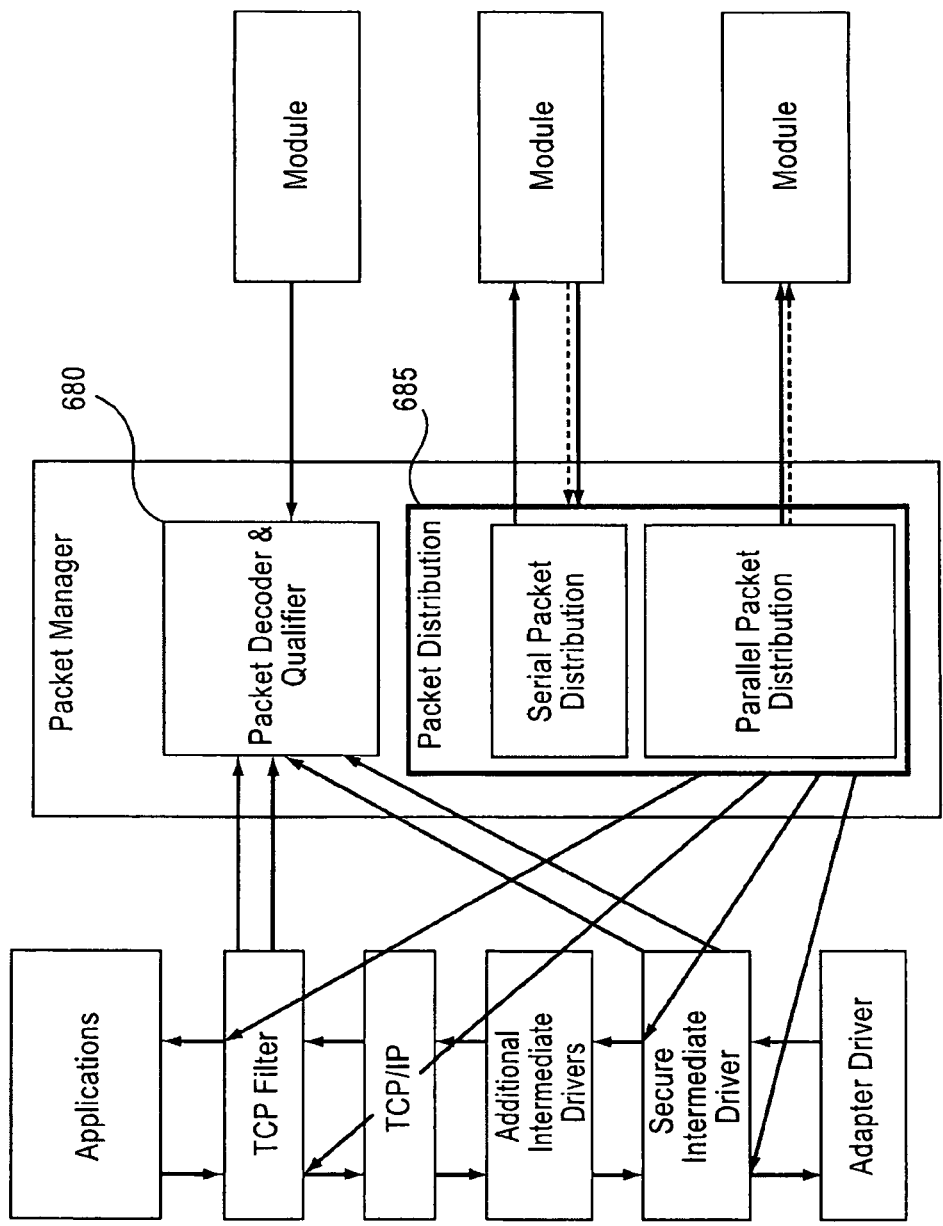
FIG. 6 illustrates an overview of an example of a packet manager usable in a configuration such as that illustrated in FIG. 4.

FIG. 6 provides an illustration of an example of an arrangement of a packet manager (PDM) that could be used in the configurations above, along with items with which the Packet Manager can interact. In the overview shown in FIG. 6, the Packet Manager can include a Packet Decoder and Qualifier 680 as well as a Packet Distribution element 685 that can adapt to either serial distribution of packets (sending the packet to a first module and when processing is complete sending it to a second module) or a parallel distribution of packets (sending a packet to multiple modules in parallel).

As illustrated in FIG. 6, the Packet Decoder can receive packets from the secure intermediate driver and/or a TCP filter. The TCP filter could be a TCP/UDP/Raw filter used to intercept packets/data to and from the TCP/IP device, the UDP device and the Raw device. This will allow a module to receive traffic before it reaches the TCP/IP stack from an application. As in prior descriptions, the Secure Intermediate Driver will be used to intercept packets from any protocol device or any additional intermediate drivers that are installed in the stack, and from the Adaptive Driver.

The PDM will get packets from each connection to the TCP/IP device. In the case where there are multiple TCP/IP addresses the PDM could identify each connection with a unique identifier. This connection identifier will have correlating information stored in an Inventory Module which is described below. The PDM will also get packets from each adapter driver that is currently installed in the system. The PDM will also identify each packet stream to/from the adapter driver with a unique identifier.

The PDM allows modules to request packets/data from each potential source. The PDM has two specific request types; the first is a serial "forward" of the packets and the second is to forward the packet information in parallel with a "smart pointer". Modules that request a serial "forward" of the packets/data will have the potential of modifying the data before the data is forwarded onto the next module or the egress of the PDM. The PDM will allow the modules to specifically ask for traffic from a specific point in the network stack (i.e., egress down from a specific TCP/IP device connection, or ingress up from the adapter driver), or from a specific direction to/from all connections in the network stack (i.e. ingress up from all adapter drivers).

The PDM will perform packet decodes (as much as possible) on all packets/data received by the PDM. The PDM will allow modules to ask for packets/data based on decoded packet/data information.

The following is a list of features that the PDM could be configured to handle:

1. The PDM will obtain traffic flows to/from the Adapter Driver with a connection that is as close to the Adapter Driver as possible.
2. The PDM will obtain traffic flows to/from the TCP/UDP/Raw filter with a connection that is as close to the Applications as possible.
3. The PDM will allow modules to register for serial packet/data forwards based on a specific location and unique device, based on a specific location for all devices, or based on a decoded packet filter.
4. The PDM will allow the modules to modify the serial packet/data traffic and will forward the modified data.
5. The PDM will allow modules to register for parallel packet/data traffic. The PDM will distribute this information using "smart pointers". Modules are not allowed to modify packet/data traffic received with a parallel packet registration.
6. The PDM will allow modules to register for parallel packet decodes information to be sent to the module. The PDM will distribute the packet decodes information using smart pointers.
7. The PDM will allow modules to specify the priority of the filter for serial packet forwarding, parallel packet forwarding, and parallel packet decode forwarding for packets/data received at any specific location. The priority of the filter will determine what order packets will be forwarded to a module. A module may specify a different priority for packets received at different points. For example a module may specify a high priority for packets received on the ingress from the adapter drivers so that it sees packets before any other modules for traffic on the way in, and specify a low priority for packets received on the ingress from the protocol drivers so that it sees packets last after any other modules for traffic on the way out.
8. The PDM will allow modules to "kill" packets/data so that the data is no longer forwarded. This will allow a remediation module to block all packets to/from devices as required.
9. The PDM will allow modules to generate new packets/data to/from any connection point.

As illustrated in many of the drawing figures and as discussed above, the security mechanism can be deployed within a node with one or more modules such as observation modules and remediation modules.

Modules could have a variety of functionality. Some modules could gather computer inventory, some modules could gather network topology, some modules could perform behavior analysis on the network traffic, and some modules could remediate network traffic. All modules in the system must be designed against a set of generic requirements for modules. The generic requirements are as follows:
1. Modules will be installed by the Core Engine and be coded to operate in kernel space or user space.
2. Modules should be able to be uninstalled on demand at run-time.
   a. When a module is asked to uninstall it should clean up all resources, and then inform the CE that it is ready to be uninstalled.
3. Modules should have the ability to persist information.
   a. Modules can temporarily ask the CE to persist some memory. This should be used when a module is being upgraded but information needs to be passed between the old and new module. In this case the CE will be passed a block of information that will be kept in memory.
   b. The modules will use a set of library functions to persist information to the hard drive or other persistent memory in the system. These library functions will encrypt the data, and obfuscate the data to avoid disseminating information to the modules.

As indicated above, the communications module will be used by all other modules to communicate with the Administration Console. The communications module may have multiple modes of communication that it can use, including:
1. Ethernet Broadcast packets—These broadcast packets will not use IP, and therefore will not be routable. However, other nodes which see these messages may route them to/from the AC.
2. UDP packets—This will be a standard UDP packet stream to the AC.
3. Spliced UDP packets—This will be standard UDP packet streams sent in different splices routed via other nodes to the AC.
4. Covert communications—this will use normal IP traffic streams and embed covert communications in to the stream so that communications can not be easily traced.
5. Covert spliced communications—this will use normal IP traffic streams, and may splice the traffic via different channels to reach the AC. The spliced traffic may be routed via other nodes to the AC.

The following features may be desirable for the CM:
1. Receive, authenticate, validate, and decrypt all messages from the AC. Encrypt, create a message integrity check, sign, and send all messages to the AC.
2. Receive all module creation messages, and when a module is complete authenticate, validate, and decrypt the module. Send the module to the module manager for installation.
3. Route all messages received to the proper module or modules.
4. Handle multiple priority messages from various modules and send those messages in the order required based on priority. The CM should be able to stop sending a lower priority message that has been partially sent in order to send a higher priority message. The CM should resume sending the lower priority message when possible, with out retransmitting the entire message.

Other potential modules that might be used include an Inventory Module (IM), a Discovery Module (DM), Remediation Modules (RM) and Observation Modules (OM).

The IM could be used by all other modules to get inventory information about the computer. The IM could track information like the following:
1. What network cards are installed in the system, and will generate a unique identifier for traffic to/from the network card. The IM will attempt to determine the type of network card; including, wireless, Ethernet, GigE card, and etc. Will determine if Microsoft VPN services are configured on the system.
2. What protocols are installed in the system, and will generate a unique identifier for the traffic to/from the protocol.
3. The software packages that are installed on the system.
4. Will attempt to determine if VPN software is installed on the system. Will specifically look for an intermediate driver from DNE and PCAUSA.
5. Will attempt to determine if a packet sniffer is installed on the system; i.e., Sniffer Pro, Etherpeek, and Ethereal. Will determine if winpcap is installed on the system.

The DM could be used by all other modules to get discovered network information. The DM could maintain information like the following:
1. The MAC addresses of any computer that has been seen on the network.
2. The IP or other network address for any MAC address seen on the network.
3. Duplicate IP addresses will be managed.
4. Multiple IP addresses from a MAC address will be managed.
5. The NNE status of computers seen on the network.
6. The packet counts and octet counts for data sent between computers seen on this network.

RMs could perform remediation against network traffic flows. These may be flows detected by Observation Modules (OMs) that are originating from malware, flows blocked by AC configuration, or other network traffic flows identified by any Observation Module (OM). Remediation may be blocking the traffic flow, resetting the traffic flow, or spoofing that the traffic flow is proceeding while blocking the flow (i.e., like a honey pot).

Initially the RMs will be "dormant" and not have any packet filters registered. They will register their APIs to the API Manager in the CE. If an RM receives a configuration message from the AC or an OM to filter a specific network traffic stream, then it will use the API manager to get the Packet Manager API, and register a serial packet filter for the traffic stream. When that packet stream is delivered to the RM, then it can perform remediation.

Typically, the RM will be required to perform the following:
1. Receive remediation requests from the AC or OMs.
2. Use the IM to determine the appropriate packet filters to use to remediate the request.
3. Register with the Packet Manager for the appropriate serial packet filters.
4. Remediate the traffic received from the Packet Manager.

OMs could perform behavior analysis on the various network packet flows received by the security mechanism. There will be different type of OMs that will look for different network behaviors. The OMs will use the other modules in the system to perform the behavior analysis.

The OMs will be required to perform the following:
1. Use the IM to determine the appropriate packet filters to use for the OM to operate properly.
2. Register with the Packet Manager for the appropriate serial or parallel packet filters.
3. If required, use the DM to get network topology information.
4. When required issue alarm information via the CM to the AC.
5. When requested issue status information via the CM to the AC.
6. If required, receive configuration information and persist that configuration information.
7. When required issue requests to the RM to provide remediation.

Given the security mechanism arrangement described above, numerous malware attacks could be quickly and efficiently addressed. Examples include such things as Rootkit attacks, network extensions from split tunnel attacks to a VPN and Wireless Extensions. These are described below.

Rootkits

Security researchers have started to issue warnings about the potential threat of rootkits. Rootkits install themselves into the kernel, and therefore can bypass all of the current anti-virus, host and network intrusion detection sensors (IDS) and anti-spyware products. Rootkits can be installed to bypass, for example, Microsoft's IP protocol. Therefore normal firewalls will not be triggered to block communications from the rootkit. Rootkits can also execute within the operating system kernel, and therefore, there is no process or executable to block with anti-virus and anti-spyware software. Rootkits will require a system approach to detect and remediate.

The above-described security mechanism could use behavior analysis algorithms to detect rootkits resident on a system, and remediate against the security risk presented by rootkits. The mechanism will have the ability install itself as a rootkit into the operating system. This gives the behavior analysis modules the ability to better monitor for other rootkits.

However, this is not sufficient, because rootkits could be developed that are aware of the NNE system. To combat these rootkits the arrangement of distributed mechanisms on multiple network nodes provides for collaborative analysis and remediation. With the collaboration of other systems, which have the capacity to monitor the behavior of each other, any rootkit can be detected.

Figure 7:
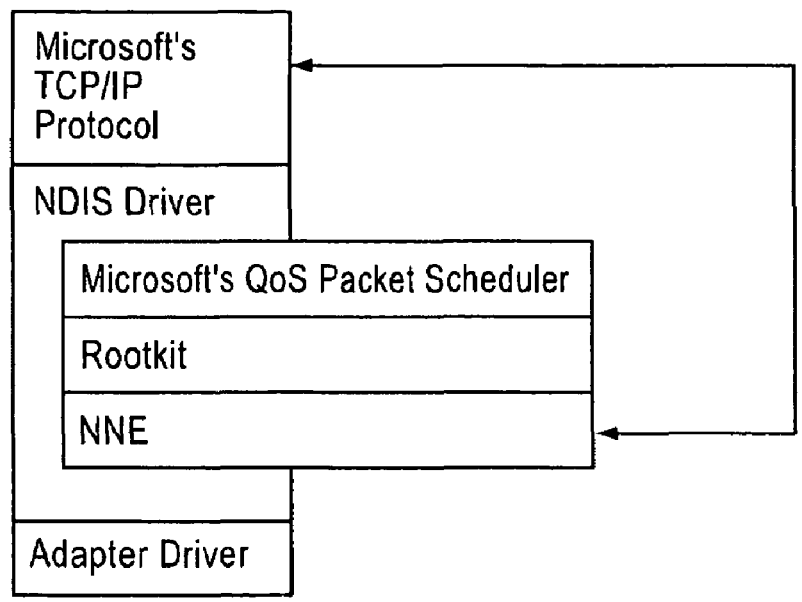
FIGS. 7 to 10 illustrate configurations useful for understanding example remediation techniques that could be used in the arrangement of FIG. 1.

FIG. 7 shows the typical stack with a rootkit normally installed. Because the modules will monitor connections to the TCP/IP protocol stack and the traffic that is sent through the module, traffic generated from the rootkit can be detected, and remediation can be applied to the traffic by the modules.

Figure 8:
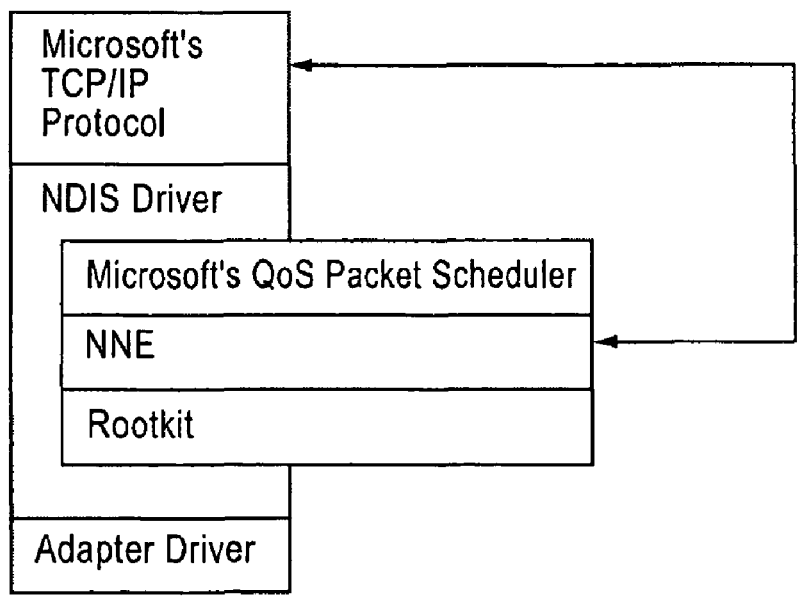

FIG. 8 shows an advanced rootkit that has abnormally inserted itself beneath the mechanism. The module will be able to monitor for this insertion, but alone it will not be able to remediate. However, the system will be able to protect against this security threat. When the rootkit attempts to communicate with any other system protected with the security mechanism, that mechanism will realize that the rootkit has interposed itself between the mechanism and the adapter driver in the tainted node and the receiving mechanism will drop the invalid communication.

Network Extensions from Split Tunnel Attacks to a VPN

The threat of Split Tunnel attacks on VPN systems has been extensively documented. However, most VPN systems have over stated their ability to block split tunnel attacks. In addition, some VPN clients allow a user to enable split tunnel communications.

Current anti-virus and anti-spyware products respond to known signatures of viruses and trojans, and therefore will always be vulnerable to currently unknown threats. Host based IDS tools may detect split tunnel attacks, but can miss attacks that covertly communicate in the network stacks with either rootkits, or stack shims such as PCAUSA's WINDIS shim. Network IDS tools are completely ineffectual in detecting split tunnel attacks because they would need to be located at every VPN endpoint.

The above-described safety mechanism will use behavior analysis algorithms to detect split tunnel communications on a client, and the mechanism will be able to remediate against the security risk presented by the split tunnel. Even if an advanced rootkit is used to create the split tunnel, the modules will be able to detect that the system is compromised, and provide remediation from the security threat.

Figure 9:
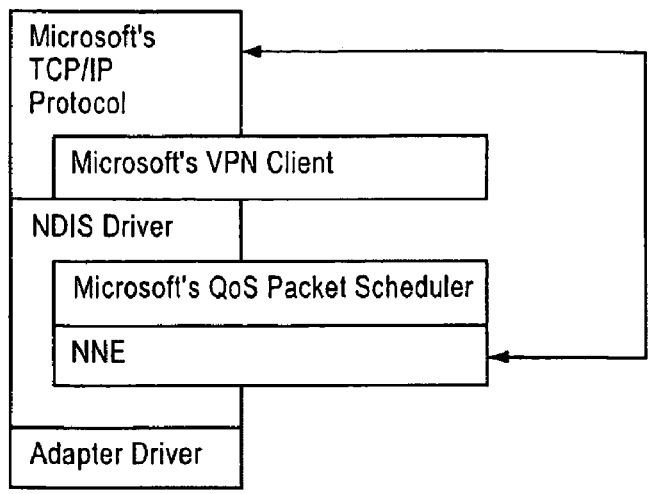

FIG. 9 shows the typical stack with the VPN client configured for VPN connections. Modules will monitor connections to the TCP/IP protocol stack and the traffic that is sent through the module. Traffic generated from the VPN and from split tunnel TCP/IP connections can be detected, and remediation can be applied to the traffic by the NNE modules.

Wireless Network Extensions

Wireless trojans or wireless root kits can be used to compromise the security of a network. This attack is similar to the VPN split tunnel attack, except that the wireless network card is used to penetrate the network security. There are several possible wireless attacks that are possible. First, users could install wireless network cards on their corporate machines to intentionally allow connections while at a near by premises or with in the corporate premises. These intentionally installed wireless network extensions create a security risk if they are compromised. However, more malicious attacks are also possible. One attack would be to infect a network with a trojan that would turn all unused wireless cards into open system unencrypted wireless APs. This trojan would allow anyone to connect to the network, without gaining physical access to the network. Corporate rogue AP scans would detect these infections at a corporate site, but would not detect machines that are located off the premises. Another possibility is to insert a wireless rootkit that would allow the target to be connected to a corporate wireless infrastructure, while also allowing a separate covert stream to be transmitted from the unit.

Current wireless solutions involve monitoring of the corporate premises for rogue APs and rogue clients. However, this traffic could be generated to look like valid wireless solutions, and without checking the wireless signature of every message these rogue scans are not effective. However, these wireless monitoring solutions are not cost effective to deploy, and do not cover users who are connecting at public wireless hot spots, or are being affected off the corporate premises. Current anti-virus and anti-spyware products will only detect known signatures of viruses and trojans, and therefore will always be vulnerable to currently unknown threats.

The safety mechanism described above will use behavior analysis algorithms to detect wireless network extensions. Covert or intentional wireless extensions will be detected with algorithms similar to the split tunnel detection algorithms. Once detected the system can disable the wireless interface to provide remediation for the security risk. The detection of covert wireless rootkits will require additional behavior analysis to detect.

Figure 10:
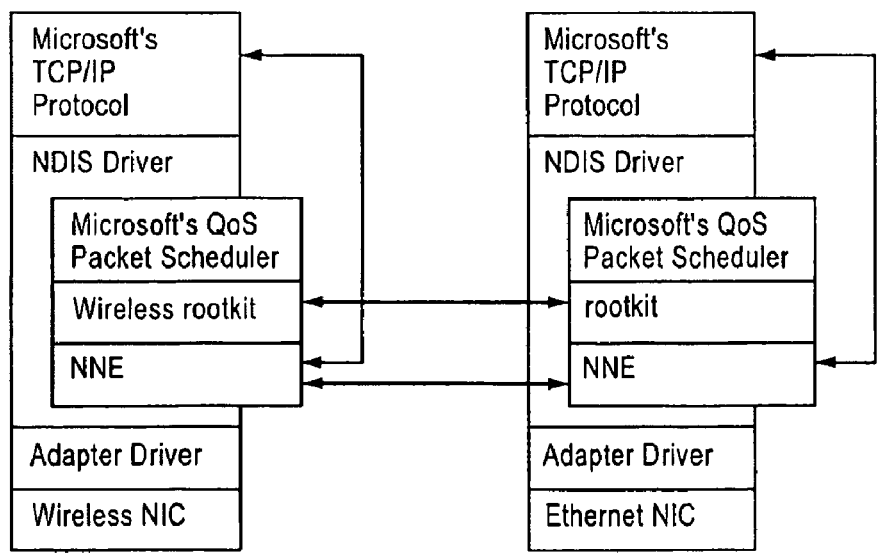

FIG. 10 shows the typical Microsoft network stacks when there is an Ethernet network card and a wireless network card. In this diagram, the wireless trojan would have access to the entire corporate network via the Ethernet network connection as shown if the safety mechanism system did not perform remediation.

CONCLUSION

As indicated through the description above, the safety mechanism is capable of adaptively and dynamically addressing various forms of malware attacks on devices and networks. The installation of the mechanism can be executed in a way that its deployment is transparent to the user of the node on which it is deployed. With its instantiation taking the form of various modules the mechanism can be quickly and easily modified by replacing or adding further observation and/or remediation modules. The use of the AC provides a common collection point for monitoring network status and the information can be used for activating further or additional remediation measures.

What is claimed is:

1. A method for monitoring data communications of a node in a data communications network comprising:
   intercepting, by a driver installed in a network stack of an operating system of the node, a data packet from the network stack of the node;
   forwarding, by the driver, the intercepted data packet to a packet manager within the node;
   distributing, by the packet manager, the intercepted data packet to a predetermined processing module within the node under control of the packet manager; and
   deriving, by the predetermined processing module, information about the communication of data by the node from said data packet.

2. The method of claim 1, wherein deriving information includes collecting inventory information concerning the node.

3. The method of claim 1, wherein deriving information includes analyzing packet flows to assess node behavior.

4. The method of claim 1, further comprising invoking a remediation module in response to the derived information.

5. The method of claim 4, further comprising creating a message related to the invoking of the remediation module.

6. The method of claim 1, further comprising creating a reporting message based on the derived information, the reporting message intended for transmission to the network by the node.

7. A system for monitoring data communications of a node in a data communications network, the system comprising:
   a memory; and
   a processor, coupled to the memory, to cause:
   a driver installed in a network stack of an operating system of the node to intercept a data packet from the network stack of the node, and to forward the intercepted data packet to a packet manager within the node;
   the packet manager to distribute the intercepted data packet to a predetermined processing module within the node under control of the packet manager; and
   the predetermined processing module to derive information about the communication of data by the node from said data packet.

8. The system of claim 7, wherein the predetermined processing module is to derive information by collecting inventory information concerning the node.

9. The system of claim 7, wherein the predetermined processing module is to derive information by analyzing packet flows to assess node behavior.

10. The system of claim 7, wherein the processor is to invoke a remediation module in response to the derived information.

11. The system process of claim 10, wherein the processor is further to create a message related to the invoking of the remediation module.

12. The system of claim 7, wherein the processor is to create a reporting message based on the derived information, the reporting message intended for transmission to the network by the node.

13. A non-transitory computer-readable medium including data that, when accessed by a machine, cause the machine to perform a method for monitoring data communications of a node in a data communications network, the method comprising:
   intercepting, by a driver installed in a network stack of an operating system of the node, a data packet from the network stack of the node;
   forwarding, by the driver, the intercepted data packet to a packet manager within the node;
   distributing, by the packet manager, the intercepted data packet to a predetermined processing module within the node under control of the packet manager; and
   deriving, by the predetermined processing module, information about the communication of data by the node from said data packet.

14. The computer-readable medium of claim 13, wherein deriving information comprises collecting inventory information concerning the node.

15. The computer-readable medium of claim 13, wherein deriving information comprises analyzing packet flows to assess node behavior.

16. The computer-readable medium of claim 13, wherein the method further comprises invoking a remediation module in response to the derived information.

17. The computer-readable medium of claim 13, wherein the method further comprises creating a reporting message based on the derived information, the reporting message intended for transmission to the network by the node.

18. The computer-readable medium of claim 16, wherein the method further comprises creating a message related to the invoking of the remediation module.

* * * * *